(12) United States Patent
Zhao et al.

(10) Patent No.: US 12,513,468 B2
(45) Date of Patent: Dec. 30, 2025

(54) MEMS MICROPHONE CHIP

(71) Applicant: AAC ACOUSTIC TECHNOLOGIES (SHENZHEN) CO., LTD., Shenzhen (CN)

(72) Inventors: Zhuanzhuan Zhao, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 517 days.

(21) Appl. No.: 17/913,453

(22) PCT Filed: May 18, 2022

(86) PCT No.: PCT/CN2022/093426
§ 371 (c)(1),
(2) Date: Sep. 22, 2022

(87) PCT Pub. No.: WO2023/206644
PCT Pub. Date: Nov. 2, 2023

(65) Prior Publication Data
US 2025/0080915 A1    Mar. 6, 2025

(30) Foreign Application Priority Data
Apr. 25, 2022    (CN) .......................... 202220974772.5

(51) Int. Cl.
*H04R 7/24*    (2006.01)
*H04R 1/22*    (2006.01)
(Continued)

(52) U.S. Cl.
CPC ............... *H04R 7/24* (2013.01); *H04R 1/222* (2013.01); *H04R 7/18* (2013.01); *H04R 19/04* (2013.01); *H04R 2201/003* (2013.01)

(58) Field of Classification Search
CPC . H04R 7/24; H04R 1/222; H04R 7/18; H04R 19/04; H04R 2201/003
See application file for complete search history.

(56) References Cited

U.S. PATENT DOCUMENTS

| 2015/0014796 A1* | 1/2015 | Dehe | B81B 3/0021 |
| | | | 257/416 |
| 2016/0112801 A1* | 4/2016 | Yoo | H04R 7/10 |
| | | | 381/174 |

(Continued)

*Primary Examiner* — Fan S Tsang
*Assistant Examiner* — Tyler Michael Liebgott
(74) *Attorney, Agent, or Firm* — Wiersch Law Group

(57) ABSTRACT

The present disclosure discloses a MEMS microphone chip having a substrate with a back cavity, a back plate fixed to the substrate, and a diaphragm unit opposite to the back plate. The diaphragm unit includes a first diaphragm spaced apart from the back plate, a support member fixed on a side of the first diaphragm away from the back cavity, and a second diaphragm spaced apart from the first diaphragm. The second diaphragm includes a support portion fixed to the support member and a free end. The first diaphragm is utilized to drive the second diaphragm having the free end so that the vibration of the second diaphragm from is no longer subject to its thickness and stress, thus significantly improving the sensitivity of the MEMS microphone chip and accordingly improving the SNR.

5 Claims, 4 Drawing Sheets

(51) Int. Cl.
 *H04R 7/18* (2006.01)
 *H04R 19/04* (2006.01)

(56) References Cited

U.S. PATENT DOCUMENTS

2020/0186940 A1\* 6/2020 Sun .......................... H04R 7/04
2020/0196065 A1\* 6/2020 Pedersen .............. H04R 19/005
2020/0245077 A1\* 7/2020 Loeppert ............... B81B 3/0051
2021/0051415 A1\* 2/2021 Duan ....................... H04R 7/06

\* cited by examiner

A–A

B

MEMS MICROPHONE CHIP

FIELD OF THE PRESENT DISCLOSURE

The present disclosure relates to micro-electromechanical systems, especially relates to a MEMS microphone chip.

DESCRIPTION OF RELATED ART

Micro-Electro-Mechanical System (MEMS) microphone is an electro-acoustic transducer fabricated by micromachining technology, which is characterized by small size, good frequency response, and low noise. With the miniaturization and thinness development of the electronic devices, the MEMS microphone is widely used in these electronic devices. The MEMS microphone commonly includes a housing and a MEMS microphone chip sealed inside the housing.

In related art, the MEMS microphone chip includes a substrate with a back cavity and a diaphragm and a back plate both mounted on the substrate. When the sound pressure acts on the diaphragm, the movement of the diaphragm changes the capacitance between the diaphragm and the back plate to achieve acoustic-electro conversion. Usually, an edge of diaphragm in related art is at least partially fixed to the substrate, thus limiting the movement of the diaphragm and the sensitivity of the MEMS microphone chip at the same time, and reducing the SNR of the MEMS microphone chip.

Therefore, it is necessary to provide an improved MEMS microphone chip to overcome the problems mentioned above.

SUMMARY OF THE INVENTION

The present disclosure provides a MEMS microphone chip with higher sensitivity and higher SNR.

The MEMS microphone chip includes a substrate with a back cavity; a back plate fixed to the substrate; and a diaphragm unit opposite to the back plate, including: a first diaphragm fixed to the substrate and spaced apart from the back plate; a support member fixed on a side of the first diaphragm away from the back cavity; and a second diaphragm spaced apart from the first diaphragm, including: a support portion fixed to the support member; and a free end surrounding the support portion, having a projection along a vibration direction located inside the back cavity.

Further, the first diaphragm includes a central portion and an extending portion extending from the central portion; the extending portion is fixed to the substrate.

Further, the MEMS microphone chip includes a spacer fixed on a side of the back plate facing the second diaphragm; the back plate includes a plurality of sound holes penetrating thereon along the vibration direction; the spacer and the second diaphragm are arranged at an interval along the vibration direction.

Further, a projection of the spacer along the vibration direction overlaps with the free end.

Further, the spacer is in an annular shape.

Further, the second diaphragm includes an edge portion surrounding the free end and fixed to the substrate; the edge portion is spaced apart from the free end to form a slot.

Further, a projection of the support member along the vibration direction is located inside the central portion of the first diaphragm.

Further, a width of the extending portion is smaller than a width of the substrate.

Further, the MEMS microphone chip includes a first fixation member configured to support the first diaphragm to be above the substrate and a second fixation member configured to support the edge portion to be above the first diaphragm; an end of the extending portion away from the central portion is fixed to the first fixation member; the second fixation member is located outside of the first fixation member.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
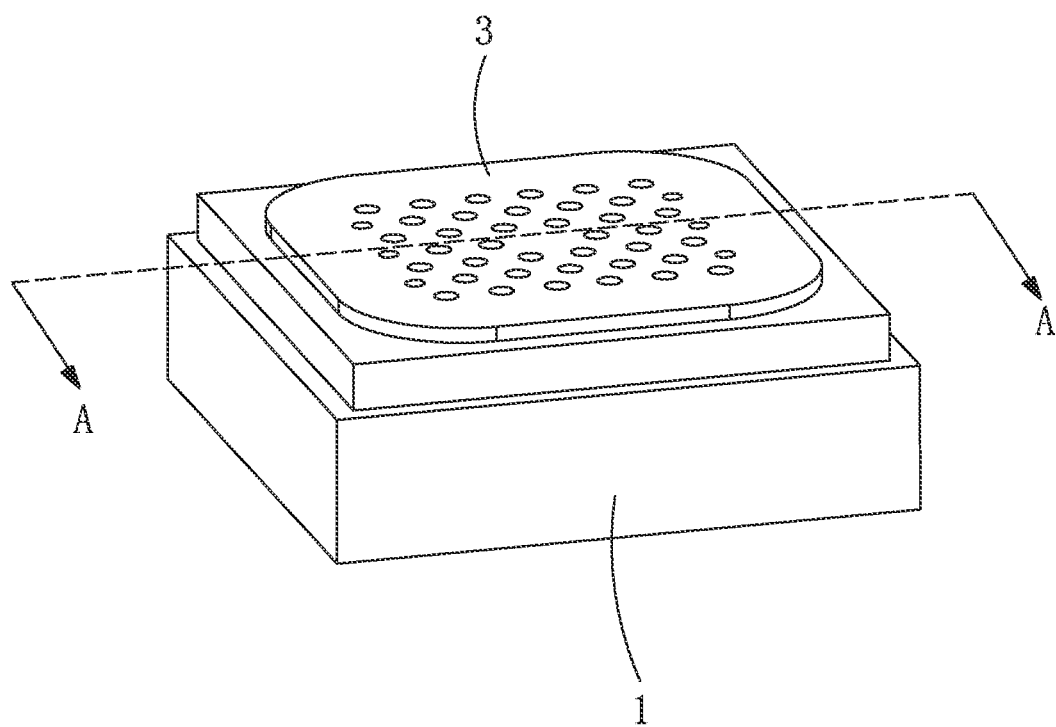
FIG. 1 is an isometric view of a MEMS microphone chip in accordance with an exemplary embodiment of the present disclosure.
Figure 2:
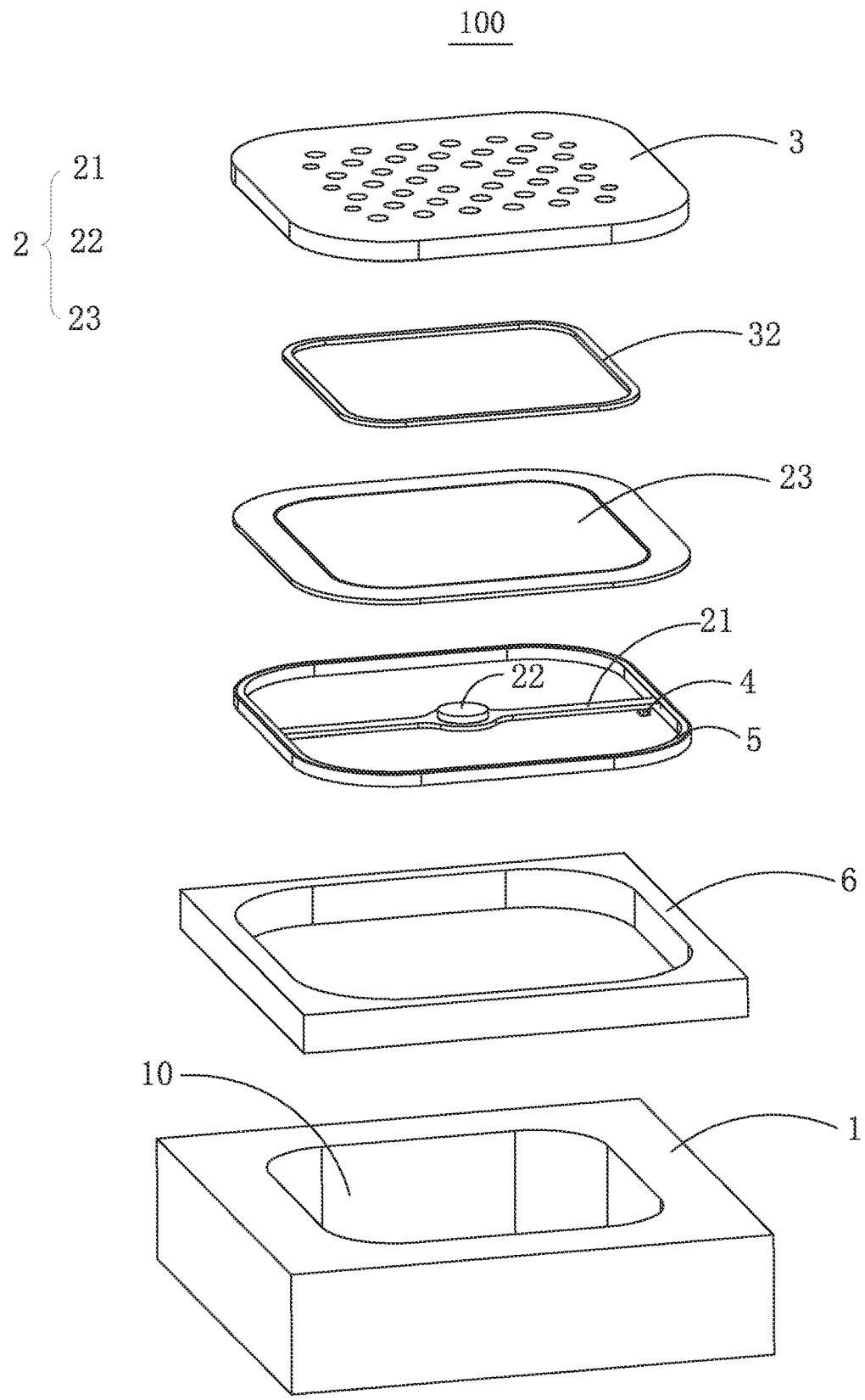
FIG. 2 is an exploded view of the MEMS microphone chip in FIG. 1.
Figure 3:
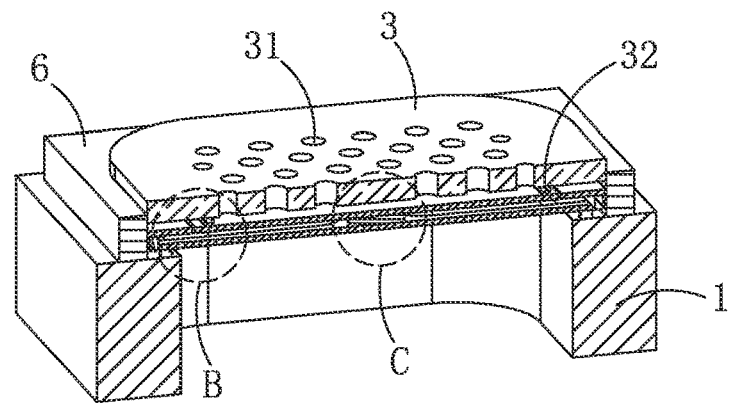
FIG. 3 is a cross-sectional view of the MEMS microphone chip taken along line A-A in FIG. 1.
Figure 4:
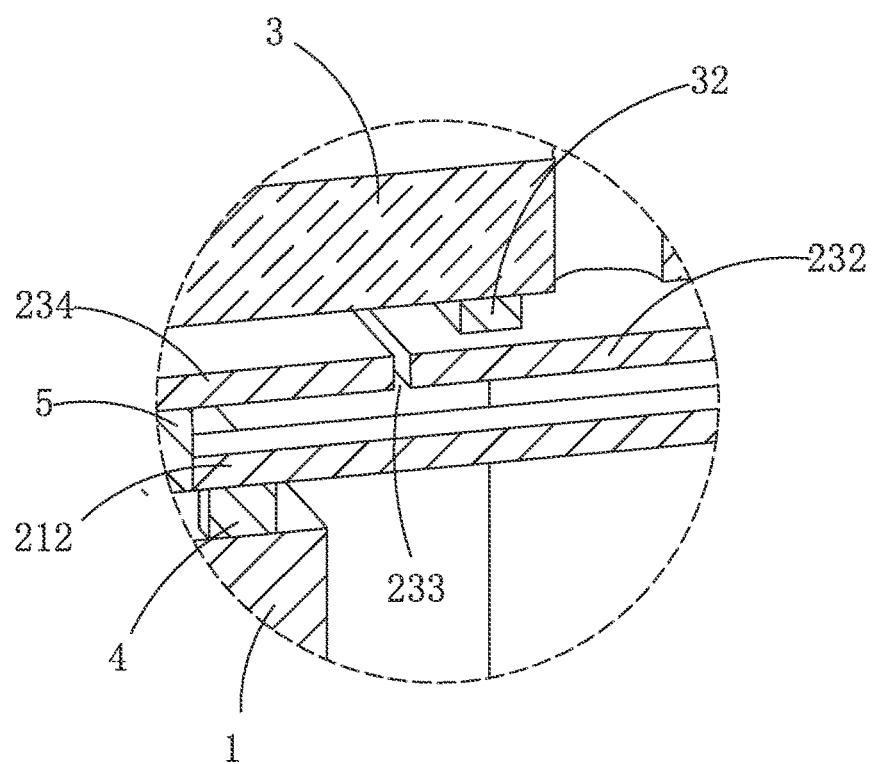
FIG. 4 is an enlarged view of part B in FIG. 3.
Figure 5:
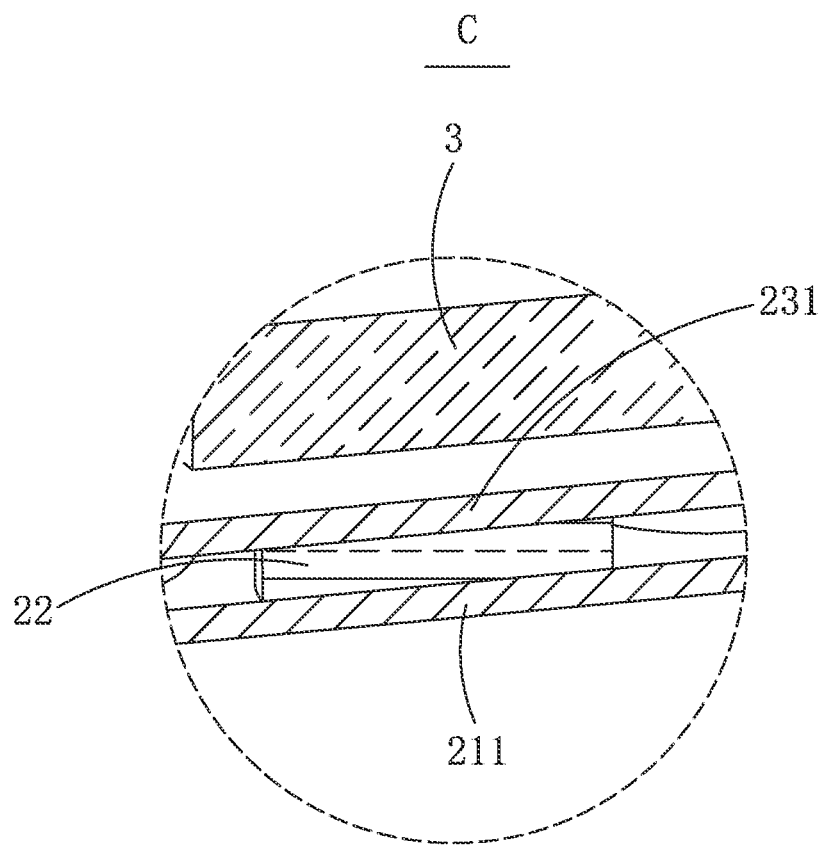
FIG. 5 is an enlarged view of part C in FIG. 3.

Please refer to FIGS. 1-5 together, a MEMS microphone chip 100 provided by an exemplary embodiment of the present disclosure includes a substrate 1 with a back cavity 10, a diaphragm unit 2 fixed on the substrate 1 and a back plate 3 opposite to the diaphragm unit 2. When the sound pressure acts on the diaphragm unit 2, the movement of the diaphragm unit 2 changes the capacitance between the diaphragm unit 2 and the back plate 3 to achieve acoustic-electro conversion.

The diaphragm unit 2 includes a first diaphragm 21 fixed to the substrate 1, a support member 22 fixed on a side of the first diaphragm 21 away from the back cavity 10, and a second diaphragm 23 spaced apart from the first diaphragm 21 and fixed on the support member 22. Specifically, the second diaphragm 23 is fixed on a side of the support member 22 away from the first diaphragm 21. And the back plate 3 is located on a side of the second diaphragm 23 away from the first diaphragm 21.

As shown in FIGS. 2-5, the first diaphragm 21 includes a central portion 211 located in a central position and an extending portion 212 extending from the central portion 211; the extending portion 212 is fixed to the substrate 1. The support member 22 is fixed on a side of the central portion 211 away from the back cavity 10. Furthermore, a width of the extending portion 212 is smaller than a width of the substrate 1. It can be understood that the width difference between the extending portion 212 and the substrate 1 can effectively improve the sensitivity of the first diaphragm 21. That is to say, the first diaphragm 21 can transmit the vibration to the second diaphragm 23 more timely and accurately.

Moreover, the second diaphragm 23 includes a support portion 231 fixed to the support member 22 and a free end 232 surrounding the support portion 231. A projection of the free end 232 along a vibration direction is located inside the back cavity 10, which means that the free end is above the back cavity 10 along the vibration direction, not the substrate 1. Or, it can be understood that an edge of the second diaphragm 23 is a cantilever structure. In the MEMS microphone chip 100 in the present disclosure, the central portion 211 having an utmost displacement is utilized to drive the second diaphragm 23 having the free end 232 so that the vibration of the second diaphragm 23 from is no longer subject to its thickness and stress. In the same time, the second diaphragm 23 has no residual stress, thus significantly improving the sensitivity of the MEMS microphone chip 100 and accordingly improving the SNR.

In order to transmitting the vibration of the first diaphragm 21 to the second diaphragm 23 more timely, an area of the support member 22 is configured to be smaller than an area of the central portion 211 of the first diaphragm 21. In other words, a projection of the support member 22 along the vibration direction is located inside the central portion 211 of the first diaphragm 21.

Additionally, the back plate 3 includes a plurality of sound holes 31 penetrating thereon along the vibration direction. A spacer 32 is provided to be fixed on a side of the back plate 3 facing the second diaphragm 23. It can be understood that the spacer 32 and the second diaphragm 23 are arranged at an interval along the vibration direction. When the second diaphragm 23 is still, the spacer 32 is spaced apart from the second diaphragm 23. When the second diaphragm 23 vibrates, the spacer 32 contacts with the second diaphragm 23 to avoid the adhesion of the second diaphragm 23 and the back plate 3. It can be understood that a projection of the spacer 32 along the vibration direction overlaps with the free end 232.

As shown in FIGS. 2-5, the second diaphragm 23 further includes an edge portion 234 surrounding the free end 232 and fixed to the substrate 1. The edge portion 234 is spaced apart from the free end 232 to form a slot 233. When the sound wave reaches the second diaphragm 23 though the sound hole 31 on the back plate 3, the spacer 32 is provided in an annular shape. When the sound wave reaches the second diaphragm 23 directly, the spacer 32 could be an unclosed ring shape. In this situation, the width of the slot 233 can be adjusted to adjust the low attenuation value, therefore improving the performance of the MEMS microphone chip 100.

The MEMS microphone chip 100 further includes a first fixation member 4 configured to support the first diaphragm 21 to be above the substrate 1 and a second fixation member 5 configured to support the edge portion 234 to be above the first diaphragm 21. An end of the extending portion 212 away from the central portion 211 is fixed to the first fixation member 4. The second fixation member 5 is located outside of the first fixation member 4. Besides, the MEMS microphone chip 100 further includes a third fixation member 6 configured to support the back plate 3 to be above the second diaphragm 23.

Compared with the related art, in the MEMS microphone chip of the present disclosure, a support member is provided to be fixed to the first diaphragm and configured to support the second diaphragm between the first diaphragm and the back plate. The second diaphragm has a free end. The central portion having an utmost displacement is utilized to drive the second diaphragm having the free end so that the vibration of the second diaphragm from is no longer subject to its thickness and stress. In the same time, the second diaphragm has no residual stress, thus significantly improving the sensitivity of the MEMS microphone chip and accordingly improving the SNR.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS microphone chip comprising:
a substrate with a back cavity;
a back plate fixed to the substrate; and
a diaphragm unit opposite to the back plate, comprising:
 a first diaphragm fixed to the substrate and spaced apart from the back plate;
 a support member fixed on a side of the first diaphragm away from the back cavity; and
 a second diaphragm spaced apart from the first diaphragm, comprising:
  a support portion fixed to the support member; and
  a free end surrounding the support portion, having a projection along a vibration direction located inside the back cavity;
a spacer fixed on a side of the back plate facing the second diaphragm; wherein
the first diaphragm comprises a central portion and an extending portion extending from the central portion; the extending portion is fixed to the substrate;
the back plate comprises a plurality of sound holes penetrating thereon along the vibration direction; the spacer and the second diaphragm are arranged at an interval along the vibration direction; a projection of the spacer along the vibration direction overlaps with the free end;
the second diaphragm comprises an edge portion surrounding the free end and fixed to the substrate; the edge portion is spaced apart from the free end to form a slot;
a projection of the spacer along the vibration direction is configured to surround the plurality of sound holes on the back plate.

2. The MEMS microphone chip as described in claim 1, wherein the spacer is in an annular shape.

3. The MEMS microphone chip as described in claim 1, wherein a projection of the support member along the vibration direction is located inside the central portion of the first diaphragm.

4. The MEMS microphone chip as described in claim 1, wherein a width of the extending portion is smaller than a width of the substrate.

5. The MEMS microphone chip as described in claim 1, further comprising a first fixation member configured to support the first diaphragm to be above the substrate and a second fixation member configured to support the edge portion to be above the first diaphragm; an end of the extending portion away from the central portion is fixed to the first fixation member; the second fixation member is located outside of the first fixation member.

* * * * *